United States Patent Office 2,829,959
Patented Apr. 8, 1958

2,829,959

PROCESS FOR PRODUCING SLAG WOOL

Helmut Knüppel, Dortmund-Nette, Germany, assignor to Dortmund - Hörder Hüttenunion Aktiengesellschaft, Dortmund, Germany No Drawing. Application August 2, 1956
Serial No. 601,635

Claims priority, application Germany August 13, 1955

7 Claims. (Cl. 75—30)

In the production of slag wool by means of blowing molten material with a gaseous pressure medium, the slag, usually blast furnace slag, has heretofore been melted down, when necessary, with the addition of minerals which are adapted to be blown, in cupola furnaces intended only for this purpose. This was done because it was believed that only in this manner was it possible to create the conditions which must be observed with regard to the homogeneity and viscosity of a slag which is to be blown to produce wool. It was believed that these conditions could be adjusted rapidly in a cupola furnace by means of regulating the additions, for example of sand or the like.

It has been proposed that the melt material produced in such a manner be subjected to further treatment in a movable furnace, after the slag has left the cupola furnace and to homogenize it and bring it into the correct state of viscosity by intimately mixing it in a rotary or tipping furnace.

In spite of the success which has been thus obtained, there has understandably been no lack of attempts to blow blast furnace slag into the form of wool directly from the tapped material. In spite of these attempts, processes which are reliable in operation and slags which exhibit a good capacity for blowing which is always constant, have heretofore not been attained.

The invention is concerned with this problem and it has for its object a process for producing slag wool by blowing the slag obtained in the blast furnace. According to the present invention, the molten blast furnace slag is tapped from the blast furnace and is charged into a heatable intermediate vessel, the slag being brought to the viscosity and homogeneity most favourable for blowing in the heatable intermediate vessel or on the passage thereto by reducing the slag to an iron content of at least 0.4%, adding up to 5% of silicic acid to the slag in the intermediate vessel and then heating the slag in the intermediate vessel until all the constituents have been completely melted down, including those which are not melted when the slag runs into the intermediate vessel.

The reduction of the iron oxides can be effected by agents known per se, for example carbon, aluminium, silicon or the like. It is not absolutely necessary for the process to be carried out in the intermediate vessel arranged behind the blast furnace. On the contrary, reduction can also take place during the running in of the slag, i. e. in the slag trough.

It has been found that a blast furnace slag containing not more than 0.4% of iron can be depended upon to assume a glassiness which is particularly favourable for blowing to give slag wool, even after the addition of very small quantities of silicic acid, which are fed to the intermediate vessel before the slag runs in.

The homogenization of the slag is effected by subsequent heating, by means of which it is intended to obtain the result of bringing any solid constituents which may still be present in the liquid blast furnace slag into solution. The slag thereafter solidifies in a regularly vitreous state, i. e. so that owing to the viscosity adjusted it draws long filaments, which characterise a good slag wool.

The temperature of blast furnace slag which has already been superheated can be adjusted by adding solid slag, broken into small pieces.

A substantially desulphurized slag can be produced by the process according to the invention. This is done by subjecting the blast furnace slag to oxidizing treatment. For this purpose, it is possible for example, during the homogenizing process carried out by heating the slag until all the constituents have been completely melted down, to operate with an oxidizing flame, either at the beginning of this process or between times and to direct the flame in particular at the surface of the bath, so that it sweeps over the said surface.

The oxidizing treatment of the slag may, however, be carried out using solid or liquid oxidic substances, either alone, or in combination with the oxidizing heating of the surface of the bath.

It is also possible to combine the desulphurization by means of oxidizing flame treatment of the surface with the reduction of the iron oxides contained in the slag, by lining the hearth of the working vessel with a lining having a reducing action, for example with a rammed carbonaceous mass. Of course, it is also possible to carry out the reduction of the ferric compounds and the desulphurization of the slag by oxidizing treatment in different vessels.

I claim:

1. In a process for producing slag wool by blowing molten blast furnace slag, that method which includes the steps of charging the molten slag from the blast furnace into a heatable intermediate vessel, reducing the slag to an iron content of at least 0.4%, adding up to 5% of silicic acid to said slag and thereafter heating said slag in said intermediate vessel until all the constituents of said slag have been completely melted down including those constituents which are not melted when said slag is charged into said intermediate vessel.

2. In a process for producing slag wool by blowing molten blast furnace slag, that method which includes the steps of tapping the slag from a blast furnace, reducing said slag to an iron content of at least 0.4%, causing said slag to flow into a heatable intermediate vessel, adding up to 5% of silicic acid to said slag and thereafter heating said slag in said intermediate vessel until all the constituents of said slag have been completely melted down including those constituents which are not melted when said slag is charged into said intermediate vessel.

3. A process according to claim 1, further including the step of controlling the temperature of said molten slag by adding small pieces of solid blast furnace slag.

4. A process according to claim 1, further including the step of subjecting said slag to an oxidizing treatment.

5. In a process for producing slag wool by blowing molten blast furnace slag, that method which includes the steps of charging the molten slag from the blast furnace into a heatable intermediate vessel, reducing the slag to an iron content of at least 0.4%, adding up to 5% of silicic acid to said slag and thereafter heating said slag in said intermediate vessel by means including an oxidizing flame directed on to the surface of said slag until all the constituents of said slag have been completely melted down and said slag is substantially desulphurized.

6. A process according to claim 1, further including the step of introducing solid or liquid substances having an oxidizing action into said slag, whereby said slag is substantially desulphurized.

7. In a process for producing slag wool by blowing molten blast furnace slag, that method which includes the steps of charging the molten slag from the blast furnace into a heatable intermediate vessel provided with a lining having a reducing action, reducing said slag to an iron content of at least 0.4%, adding up to 5% of silicic acid to said slag and thereafter heating said slag in said intermediate vessel until all the constituents of said slag have been completely melted down including those constituents which are not melted when said slag is charged into said intermediate vessel.

References Cited in the file of this patent

UNITED STATES PATENTS

| | | |
|---|---|---|
| 318,554 | Eames | May 26, 1885 |
| 1,319,061 | Garred | Oct. 21, 1919 |
| 1,535,109 | Davies | Apr. 28, 1925 |

OTHER REFERENCES

Canadian Mining and Metallurgical Bulletin for January, 1948, pages 20 to 24, inclusive.